United States Patent
Cargnel et al.

(10) Patent No.: US 8,960,895 B2
(45) Date of Patent: Feb. 24, 2015

(54) COLLAPSIBLE SPECTACLE

(75) Inventors: Roberto Cargnel, Sospirolo (IT); Valter Paganin, Taibon Agordino (IT)

(73) Assignee: Silvietta S.r.l., Rimini (IT)

( * ) Notice: Subject to any disclaimer, the term of this patent is extended or adjusted under 35 U.S.C. 154(b) by 0 days.

(21) Appl. No.: 14/003,179

(22) PCT Filed: Mar. 4, 2011

(86) PCT No.: PCT/IT2011/000057
§ 371 (c)(1),
(2), (4) Date: Sep. 4, 2013

(87) PCT Pub. No.: WO2012/120547
PCT Pub. Date: Sep. 13, 2012

(65) Prior Publication Data
US 2013/0342804 A1 Dec. 26, 2013

(51) Int. Cl.
*G02C 5/16* (2006.01)
*G02C 3/00* (2006.01)
*G02C 5/02* (2006.01)
*G02C 5/14* (2006.01)
*G02C 5/00* (2006.01)
*G02C 5/22* (2006.01)

(52) U.S. Cl.
CPC *G02C 3/006* (2013.01); *G02C 5/02* (2013.01); *G02C 5/146* (2013.01); *G02C 5/143* (2013.01); *G02C 5/16* (2013.01); *G02C 5/006* (2013.01); *G02C 5/2272* (2013.01)
USPC ............ 351/114; 351/121; 351/123; 351/133

(58) Field of Classification Search
CPC .......... G02C 5/006; G02C 5/008; G02C 5/02; G02C 5/08; G02C 5/10; G02C 5/14; G02C 5/143; G02C 5/146; G02C 2220/22
USPC ................... 351/63, 111, 113, 114, 116, 121, 351/123–126, 133
See application file for complete search history.

(56) References Cited

U.S. PATENT DOCUMENTS

| | | | |
|---|---|---|---|
| 182,013 A | 9/1876 | Andross | |
| 2,753,762 A | 4/1953 | Dorgelys | |
| 4,720,186 A * | 1/1988 | Douillard | 351/63 |
| 4,740,069 A * | 4/1988 | Baum | 351/57 |
| 2005/0074137 A1* | 4/2005 | Bailey | 381/322 |

FOREIGN PATENT DOCUMENTS

| | | |
|---|---|---|
| EP | 0 354 051 A2 | 2/1990 |
| EP | 1 845 404 A1 | 10/2007 |
| WO | 03/021335 A1 | 3/2003 |
| WO | 2009/068291 A1 | 6/2009 |

* cited by examiner

*Primary Examiner* — Huy K Mai
(74) *Attorney, Agent, or Firm* — Alan G. Towner, Esq.; Pietragallo Gordon Alfano Bosick & Raspanti, LLP

(57) ABSTRACT

A spectacle frame comprises two opposite lens support elements (10,20) and two opposite flexible temples (30,40). Each support element (10,20) has a channel (13,23) with an attachment seat (14,24). Each temple (30,40) has an end having attachment members (33,43) that are suitable to engage the attachment seat (14,24) of a respective support element (10,20). Each temple (30,40) is suitable to slide along the channels (13,23) of the two opposite support elements (10,20) such that the attachment members (33,43) of a temple (30,40) engage the attachment seat (14,24) of the support element (10,20) opposite to said temple (30,40).

7 Claims, 4 Drawing Sheets

COLLAPSIBLE SPECTACLE

FIELD OF THE INVENTION

The present invention relates to a spectacle frame.

Particularly, the present invention relates to a frame for a spectacle of a farsighted type or however to be used with discontinuity.

BACKGROUND OF THE INVENTION

Traditional spectacle frames consist of a front mount that contains, supports and positions corrective or protective lenses, and of a pair of side temples, having one free end and one end hinged to corresponding ends of the front mount, said hinge ensuring the opening and closing of the spectacle frame, for improved arrangement and positioning of the same during use, whereas, when the temples are closed on the front mount in the rest position thereof, ensure a small size of the same.

When the spectacle is to be used occasionally, such as a farsighted person's spectacle, the size thereof becomes a serious problem, in that the same spectacle, even when it is not used, requires to be stored and still be at hand for any next occasion of use.

A traditional shape for a spectacle case is the one that provides for the latter to be placed within cases, either rigid or flexible, that can be kept for example within a pocket of the jacket or on the desk, said cases being however a further encumbrance, i.e. they are not a solution to this problem but just a protection against accidental impacts or falls.

A more recent shape for a spectacle case has been provided by using strings or chains having the ends thereof fastened to the spectacle temples and the middle part thereof slung around the neck by the wearer, such as to have the spectacle hanging on the chest and at hand for any use thereof. This solution, however, has not solved the problem of the spectacle bulk, which hinders the wearer's movements that the wearer has to perform during the day.

These drawbacks have been addressed by providing collapsible spectacle, which can be stored for example within a smaller box or case, being however capable of being easily found for occasional use. An example is suggested in FR 2.538.921 and U.S. Pat. No. 5,208,616. These and other similar solutions achieve the advantage of reducing the spectacle size, during the rest step, however the overlaying and folding in several layers of the front mount elements and temple elements, results in a considerable thickness of the collapsed spectacle, which brings about problems in terms of storage, for example within a pocket of the suit, in addition to causing a rapid wear of the spectacle and a continuous chance of torsions and deformations caused by accidental impacts or poor ability in unfolding the spectacles, thereby making them rapidly deformed and hence unusable.

The utility model ES 1.054.274 suggests a different constructive solution that overcomes these wear and malformation drawbacks, by providing a pair of lenses with two rings that are provided with outer ends which are securely joined to a semi-rigid cable to be applied to the wearer's neck, whereas the inner ends can be attached to each other, by means of magnetic elements. However, this solution does not solve the problems of the bulk of the two front mount parts and of its uncomfortable semi-rigid cable slung around the neck, which however hinders the wearer's movement and does not allow him/her to, for example, fasten the car seat belt, and it is also very annoying in case of people with long hair.

A more recent constructive solution has been suggested in patent application BL2006A000003 and provides for the implementation of a spectacle frame made of dismountable elements, which are joined and aligned to each other by means of temple-positioning cables acting as a counterbalance, by entraining a pair of lens-holding rings and forcing it to fit within an intermediate element that acts like a bridge. On the one hand, if this solution undoubtedly reduces the size of the spectacle when it is not used, on the other hand it has created disturbance problems that are caused by the presence of counterbalances, in addition to be easily entangled and not very practical for an unskilled person and still does no solve the annoyance it causes to a person with long hair.

SUMMARY OF THE INVENTION

The main task of the object of the present invention is to be capable of providing a spectacle frame that is perfectly efficient and functional, when it is worn, while, during the rest step, it can be worn around the neck or on the head, i.e. readily available and applicable to any reading or eye-protection requirements, but without the spectacle having to adopt a determined size and rigid shape when it is at rest, on the contrary being adapted and flexible upon any impact or variation of the space available to the person that holds it.

Within this task, another important object of the invention is to be capable of ensuring the maximum lightness of the spectacle, both when it is worn and when it is stored, without having to resort to positioning counterbalances for the lenses.

Another object of the present invention is to be capable of providing a spectacle that is comfortable to wear and shift between the use and rest positions, for example by acting as with a traditional stethoscope, in any case without any annoyance for persons having long hair also flowing down the chest.

The last but not least object of the present invention is to be capable of providing a spectacle consisting of a few and steady parts, which is structurally very simple and easy to assemble, and that also positively accounts on manufacturing time and costs.

BRIEF DESCRIPTION OF THE DRAWINGS

These and other objects are achieved by the spectacle frame according with claim 1. The spectacle frame according with the present invention is described and illustrated in greater detail herein below, according to a merely indicative and non-limiting embodiment, with reference to the attached figures, in which:

DETAILED DESCRIPTION

Figure 1:
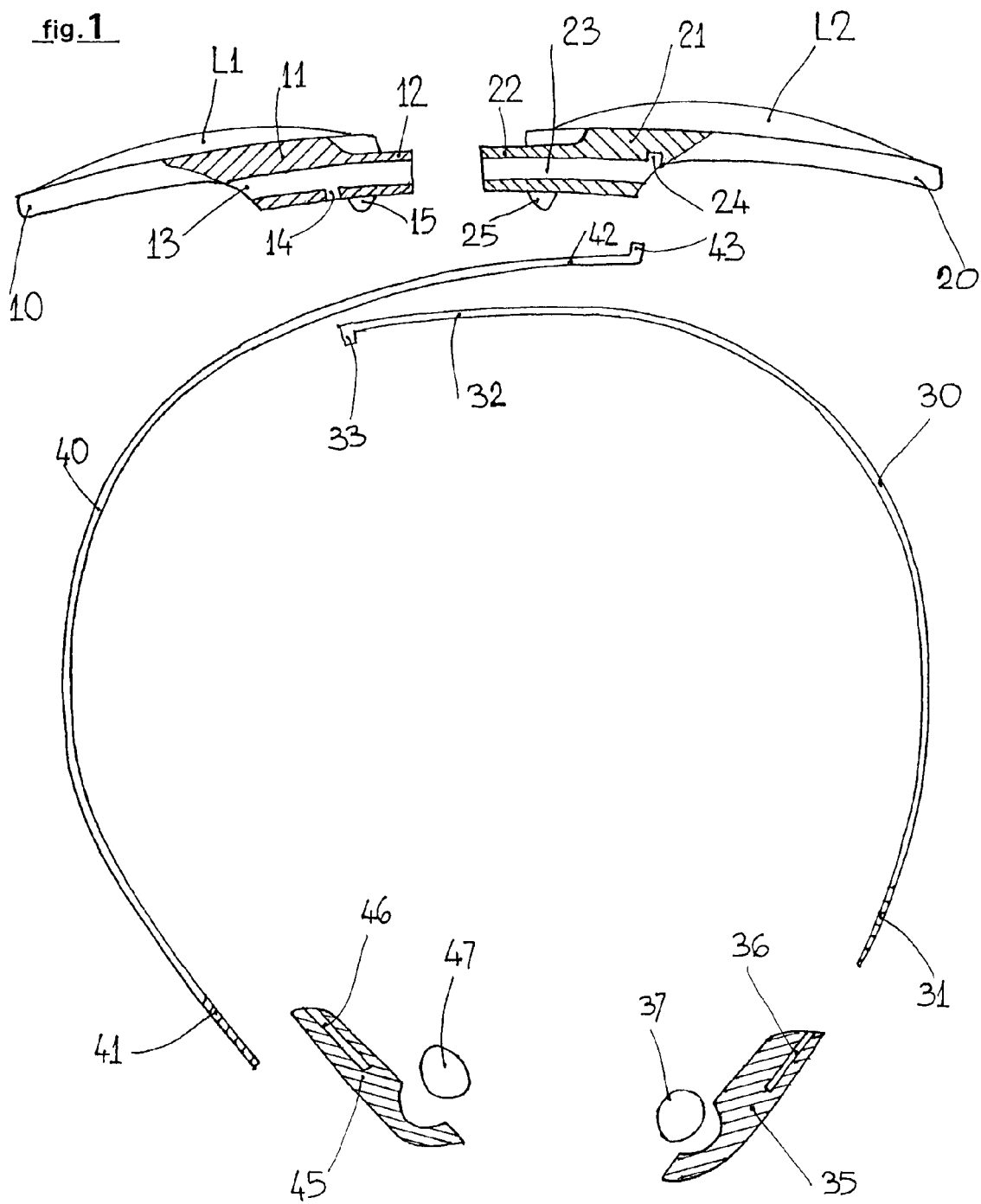
FIG. 1 is a plan, cut-away view of the main elements composing the spectacle frame being the object of the present invention.

With reference to FIGS. 1 to 4, the spectacle frame according with the present invention comprises two opposite lens support elements 10,20, eyebrow pieces 10,20 in the example, each being intended to support a corresponding lens L1,L2.

Throughout the present invention and in the description below, the term "opposite" has to be intended as referred to the relative position of the two lens support elements of the spectacle frame relative to the nose bridge.

In the example, the two support elements 10,20 comprise a support element 10 intended to support a left lens L1 and a right support element 20 intended to support a right lens L2.

According with one embodiment, the lenses L1,L2 can be corrective lenses or protective sunglass lenses.

The spectacle frame further comprises two opposite flexible temples 30,40, each suitable for being attached to a corresponding support element 10,20.

In the example, the two temples 30,40 comprise a left temple 40 and a right temple 30.

According with one embodiment, each support element 10,20 has a groove (not shown in the figures) housing the respective lens L1,L2 and/or members (not shown in the figures) for fixing the lens L1,L2 for example using a nylon wire.

Each support element 10,20 has a channel 13,23 having an attachment seat 14,24. According with one embodiment, one of the attachment seats, in the example the seat 24, is arranged within the respective channel 23 on the side facing the front part of the frame and the other attachment seat, in the example the seat 14, is arranged within the respective channel 13 on the side facing the rear part of the frame.

Advantageously, the attachment seat 14 matches a through hole provided in the rear wall of the channel 13.

Preferably, the channels 13,23 have a rectangular or square section.

Each temple 30,40 further has an end 32,42 having attachment members 33,43 suitable to engage the attachment seat 14,24 of a respective support element 10,20.

According with one embodiment, the attachment members 33,43 comprise respective teeth suitable to engage the corresponding attachment seat 14,24.

Particularly, each temple 30,40 is suitable to slide along the channels 13,23 of the two opposed eyebrow pieces 30,40 such that the attachment members 33,43 of a temple engage the attachment seat of the support element opposite to this temple.

In the example, the left temple 40 is suitable to slide along the channels 13,23 of the left support element 10 and right support element 20 such that the attachment members 43 of the left temple engage the attachment seat 24 of the right support element 20 opposite to the left temple 40.

On the other hand, the right temple 30 is suitable to slide along the channels 13,23 of the right support element 20 and left support element 10 such that the attachment members 33 of the right temple 30 engage the attachment seat 14 of the left support element 10 opposite to the right temple 30.

According with one embodiment, each support element 10,20 has a projection 12,22 in which the respective channel 13,23 is provided.

Preferably, the projections 12,22 support respective nose pads 15,25.

According with one embodiment, the projections 12,22 are positioned on the respective support element 10,20 such as to define the nose bridge of the frame when the attachment members 33,43 of the temples 30,40 are engaged within the respective attachment seats 14,24.

According with one embodiment, the projections 12,22 are rearly arranged, at the area of the nose bridge of the frame. In the example, each support element 10,20 has a rear portion 11,21, arranged at the area of the nose bridge joining the two eyebrow pieces 10,20 and from which the projections 12,22 protrude.

Preferably, the projections 12,22 protrude from the respective support element 10,20 by a length equal to half the length expected for the bridge which is required to move the lens L1,L2 away from each other and arrange them in the proper position for a person who wears the spectacle.

According with one embodiment, when the attachment members 33,43 of a temple 30,40 are disengaged from the respective attachment seat 14,24 of the opposite support element 10,20, said opposite support element 10,20 can slide along the respective temple 30,40 relative to the temple 30,40.

According with one embodiment, the temples 30,40 are made of a flexible material, preferably semi-rigid, and with a curvature memory, for example shape-memory harmonic steel, and have a rectangular section, a width slightly lower than the width of the channel 13,23 and a thickness slightly lower than half the thickness of the same channels 13,23.

Each temple 30,40 has a free end 31,41 opposite to the end 32,42 which is provided with the engagement teeth 33,43. The free end 31,41 is preferably knurled or roughened in order to be firmly housed within a recess 36,46 of a terminal 35,45 which is, in the example, provided with an insert 37,47, for example made of rubber, which facilitates retaining the temple 30,40 on the head of the wearer of the frame.

Figure 4:
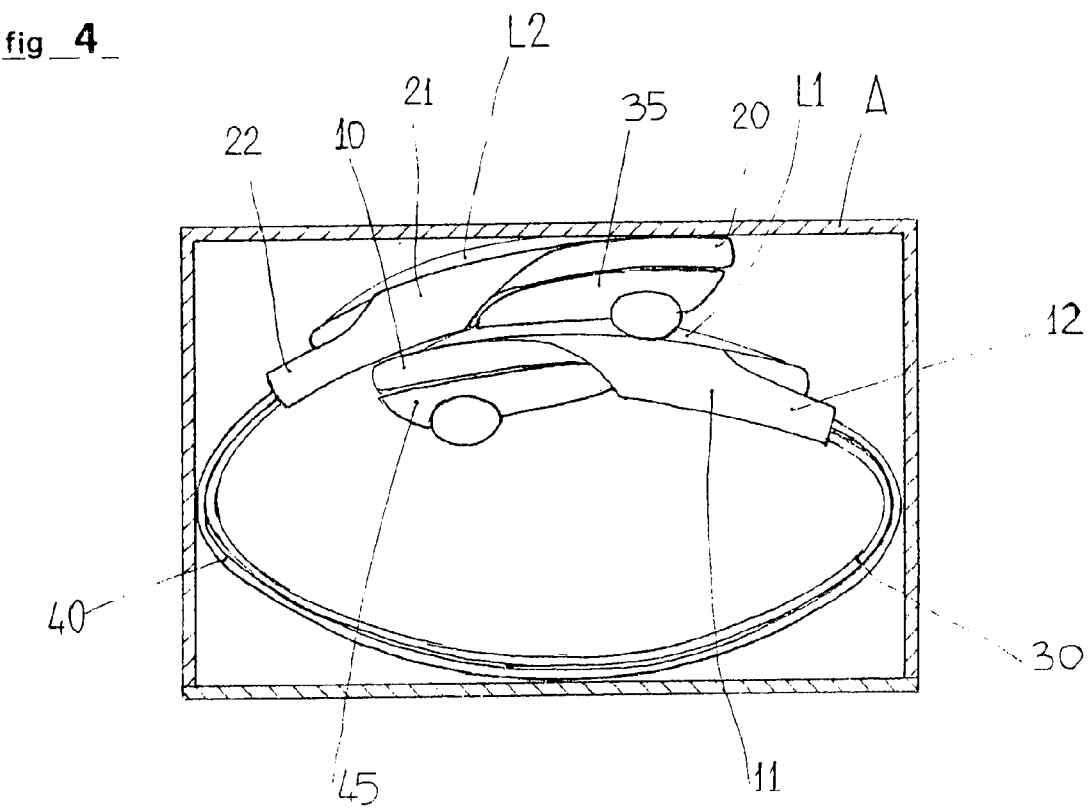
FIG. 4 is a plan view of the same spectacle as in FIG. 3, which is illustrated as being in a rest and possible storage condition thereof.
Figure 5:
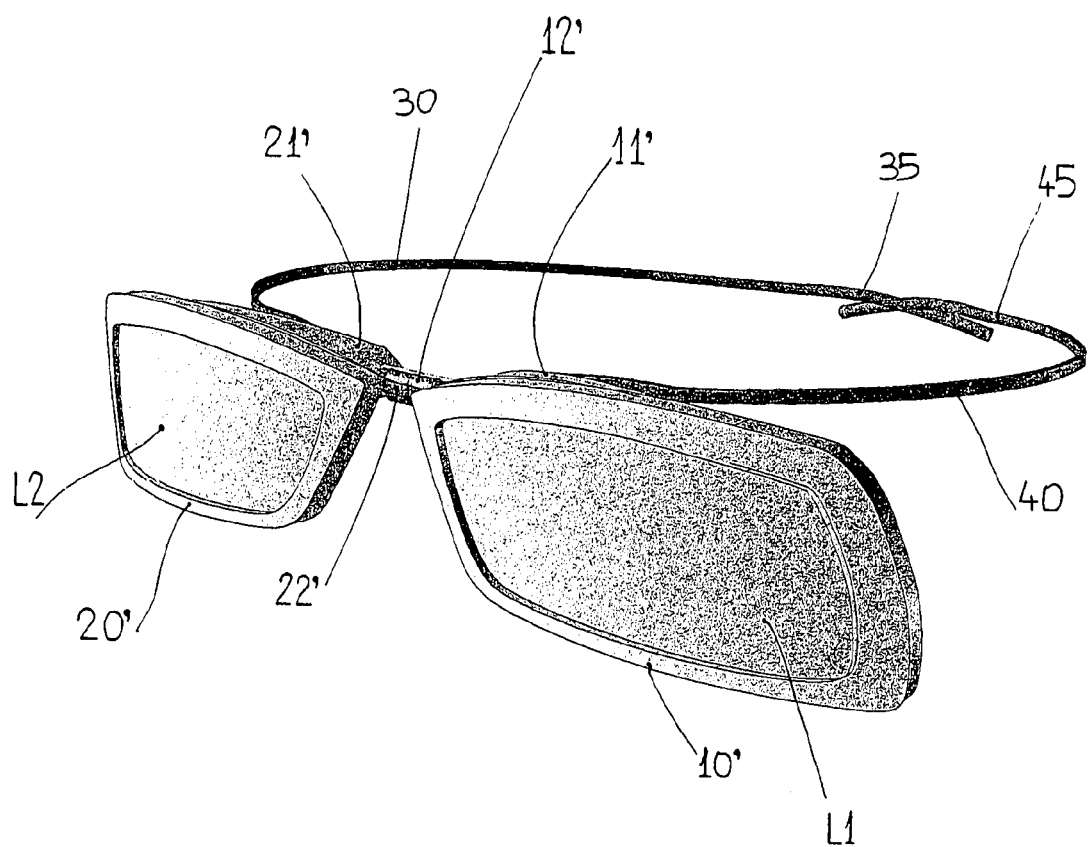
FIG. 5 is a perspective view of a spectacle provided according to the present invention, though having the front mount shape thereof different from the front mount with simple eyebrow pieces as illustrated in FIGS. 1 to 4.

With reference to FIG. 5, the possibility of providing a similar spectacle frame using rings interi 10',20' for supporting the lenses L1,L2 in replacement of the eyebrow pieces 10, 20 illustrated in FIGS. 1 to 4, is shown. The same rings 10',20' or the corresponding eyebrow pieces 10,20, as well as the temples 30,40, can be made of plastics or a suitable metal alloy.

From FIG. 5 it may also be seen that said rings 10',20' are provided with corresponding projections 12', 22' for the attachment and sliding of corresponding temples 30,40, according to the above.

Figure 2:
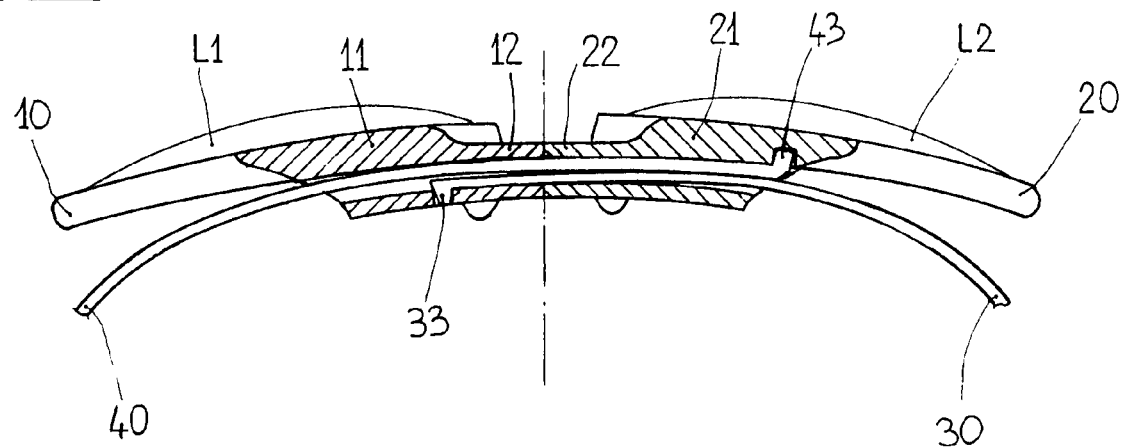
FIG. 2 is a plan view of the same elements in FIG. 1, which are assembled to each other to form the front mount of the same spectacle frame.

A possible assembly method of the spectacle frame of the present invention is described below, in addition to the operation thereof, particularly with reference to FIGS. 2 to 4, by referring in a non-limiting mariner to a solution with two eyebrow pieces 10,20.

Before applying the terminal 35, the end 31 of the temple 30 is inserted within the channel 13 of the eyebrow piece 10, by passing said end 31 also within the channel 23 of the adjoining eyebrow piece 20, until the tooth 33 thereof abuts against the attachment seat 14 of the eyebrow piece 10.

Similarly, before applying the terminal 45, the end 41 of the temple 40 is introduced within the channel 23 of the eyebrow piece 20, by passing said end 41 also within the channel 13 of the adjoining eyebrow piece 10, such that the inner surface of the temple 40 slides on the outer surface of the temple 30, until the tooth 43 thereof abuts to the attachment seat 24.

Figure 3:
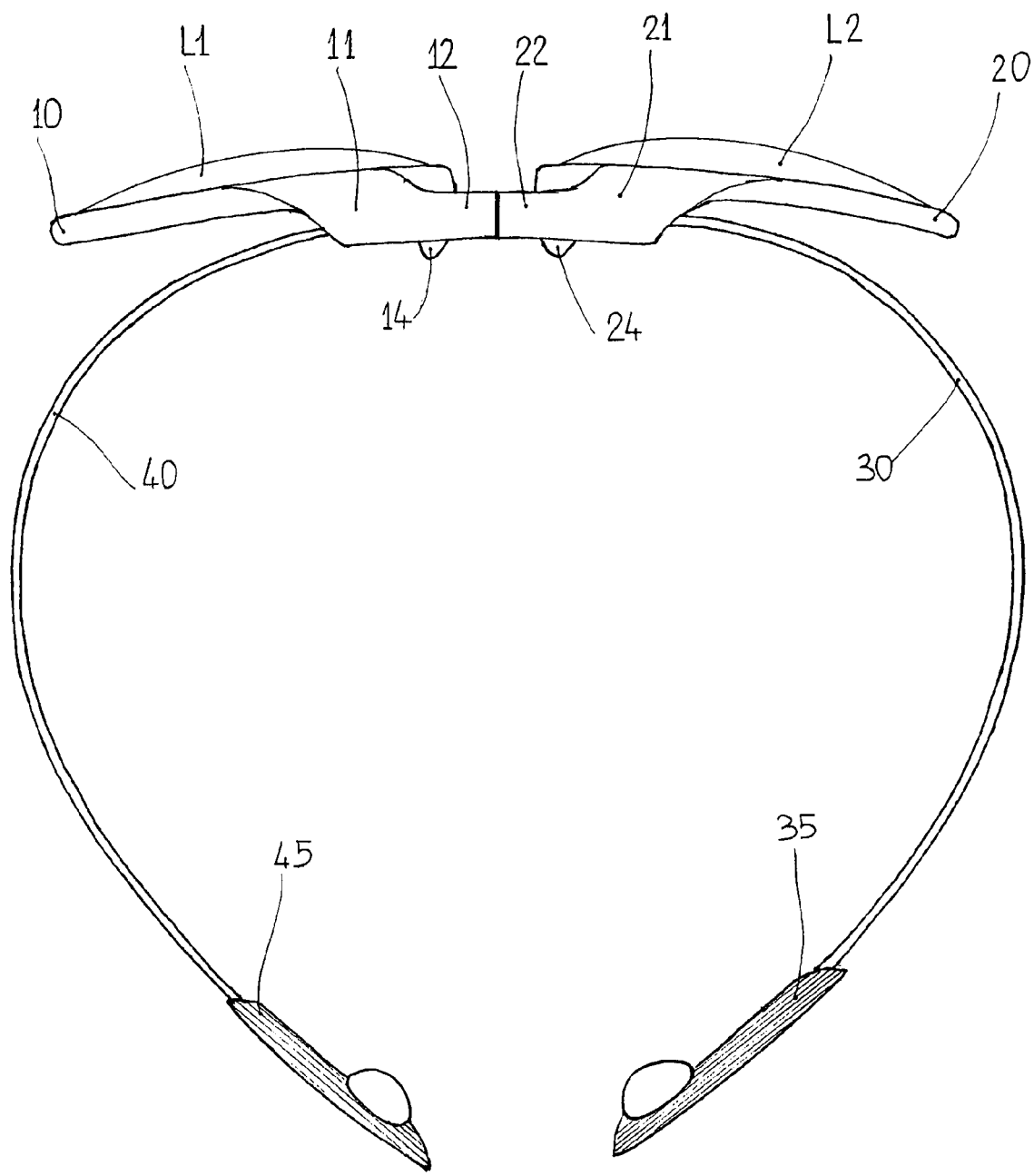
FIG. 3 is a plan view of the same spectacle elements as in FIGS. 1 and 2, which are illustrated in the visual or protective usage conditions of the same spectacle applied to a person's face.

The mutual sliding of the temples 30 and 40 causes the teeth 33 and 43 thereof to be forcibly fit within the attachment seats 14 and 24, respectively, and consequently, the two eyebrow pieces 10,20 to be pulled and shifted until the projecting ends 12,22 thereof met each other, thereby aligning the eyebrow pieces 10,20 and the lenses L1,L2 thereof and providing a front mount of spectacle that is operating and can be placed on the face, by means of the respective nose pads 15,25, as shown in FIG. 3.

As the arc-shape is pre-memorized by the temples 30,40, the latter can be comfortably placed on the ears of the spectacle wearer, thereby also ensuring the suitable moderate pressure on the head in order to guarantee the best stability of the spectacle on the face.

Due to the same memorized arc-shape of the temples 30,40, the spectacle can also be, for example, lifted and positioned on the forehead, as well as lowered therefrom, in order to be cantilevered-supported, with the terminals 35,45 thereof being retained on the neck in the same way as wearing a stethoscope.

When the temples 30,40 are pushed in the opposite direction relative to the pulling movement described above, or when the two eyebrow pieces 10,20 are pulled, the two eyebrow pieces 10,20 are moved away from each other until the eyebrow piece 10 can touch the edge of the terminal 45 and the eyebrow piece 20 the edge of the terminal 35, respectively, as illustrated in FIG. 4.

The guided translation of the eyebrow pieces 10,20 and lenses L1,L2 thereof, in addition to their respective engagement with the teeth 33,43 of the temples 30,40 within the attachment seats 14,24 thereof, is also provided by the same temples 30,40 that slide overlapped and snugly guided within the rectangular or square channels 13,23, thereby forcing the eyebrow pieces 10,20 to be joined to each other always in a perfect mutual vertical alignment position.

With further reference to FIG. 4, it may be seen that the flexibility of the temples 30,40 also allows the latter to be mutually wound, in order to accommodate and store the spectacle within a small-sized case A, while providing for the spectacle to recover the normal opening position thereof, as illustrated in FIG. 3, after storage within said case A has ceased.

From what has been described and illustrated above, it is apparent that the spectacle frame according to the present invention results to be efficient and functional when it is worn, while when it is not used, it can be worn around the neck or on the head, in order to be easily available, without having to become bulky or take a rigid shape, thereby being adapted and flexible against any impact or variation in the available space for the person storing it, according with the main object stated herein.

The spectacle frame of the present invention provides the side translation of the lens support elements, without having to wear and move glasses with the hinged and rigid temples that are presently required for applying the spectacle to the face, in addition to reduce the size thereof during rest and storage.

Due to the above-described structural simplicity thereof, the spectacle frame is easy and intuitive to use, besides being very light, small-sized and cost-effective, according with other objects stated herein.

It should be understood that the implementation described above can be also carried out in other constructive configurations. For example, it is feasible that, in addition to the two projections 12,22 providing the frame bridge, two opposite magnetic or mechanic elements are applied in order to improve the stability of the joint of the two eyebrow pieces 10,20 during use, as well as a greater length can be provided for the projections 12,22, or intermediate spacer rings can be interposed between the two projections 12,22, in order to be capable of registering the minimum center distance of the lenses L1,L2.

A further possibility is to provide rear portions 11,21 having for example a length similar to the length of the individual eyebrow piece 10,20, using temples 30,40 having a suitable greater flexibility or arc-shape, as well as to provide the eyebrow pieces 10,20 or rings to be entirely made from plastics or metal, also with the possibility of applying projections 12',22' made of metal which may be added by means of pins, as shown in FIG. 5.

It is also possible to invert the overlapping between the ends 32,42 of the temples 30,40, of course by inverting the position of the respective tooth 33,43 and the position of the respective attachment seats 14,24, as well as to apply any type of terminal 35,45, besides providing temples 30,40 that are equipped with opposite semi-cylindrical or polygonal surfaces, of course adopting opposite surfaces of the channels 13,23.

Obviously, those skilled in the art, aiming at meeting contingent and specific requirements, will be able to bring about a number of modifications and variations to the spectacle frame according to the above-described invention, which are all encompassed within the scope of protection of the invention such as defined in the following claims.

The invention claimed is:

1. A spectacle frame comprising:
two opposite lens support elements, each support element being intended to support a corresponding lens,
two opposite flexible temples, each temple being suitable to be attached to a corresponding support element, wherein
each support element has a channel having an attachment seat,
each temple has an end having attachment members suitable to engage the attachment seat of a respective support element,
each temple being suitable to slide along the channels of the two opposed support elements such that the attachment members of a temple engage the attachment seat of the support element opposite to said temple.

2. The spectacle frame according with claim 1, wherein:
said two opposite support elements comprise a left support element and a right support element,
said two opposite flexible temples comprise a left temple and a right temple,
the left temple being suitable to slide along the channels of the left support element and right support element such that the attachment members of the left temple engage the attachment seat of the right support element opposite to the left temple, and vice versa.

3. The spectacle frame according with claim 1, wherein each support element has a projection in which the respective channel is provided, the projections being positioned so as to define the frame nose bridge when the attachment members of the temples are engaged within the respective attachment seats.

4. The spectacle frame according with claim 1, wherein one of said attachment seats is arranged within the respective channel on the side facing the front part of the frame and the other attachment seat is arranged in the respective channel on the side facing the read side of the frame.

5. The spectacle frame according with claim 1, wherein said attachment members comprise respective teeth suitable to engage the corresponding attachment seat.

6. The spectacle frame according with claim 1, wherein, when the attachment members of a temple are disengaged from the respective attachment seat of the opposite support element, said opposite support element being capable of sliding relative to said temple along said temple.

7. The spectacle frame according with claim 1, wherein each temple has a free end opposite to the end provided with the engagement members, said free end defining a retaining portion for the temple on the head of the wearer of the frame.

* * * * *